United States Patent
Zhang et al.

(10) Patent No.: US 8,965,377 B2
(45) Date of Patent: Feb. 24, 2015

(54) METHOD, SYSTEM AND DEVICE FOR REPORTING USER LOCATION INFORMATION

(75) Inventors: Juan Zhang, Beijing (CN); Ying Wang, Beijing (CN); Yihua Jiang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 220 days.

(21) Appl. No.: 12/994,841

(22) PCT Filed: May 26, 2009

(86) PCT No.: PCT/CN2009/000591
§ 371 (c)(1),
(2), (4) Date: Jan. 7, 2011

(87) PCT Pub. No.: WO2009/143708
PCT Pub. Date: Dec. 3, 2009

(65) Prior Publication Data
US 2011/0098048 A1    Apr. 28, 2011

(30) Foreign Application Priority Data
May 27, 2008  (CN) .......................... 2008 1 0113007

(51) Int. Cl.
*H04W 36/00* (2009.01)
*H04W 64/00* (2009.01)
H04W 4/02 (2009.01)
*H04W 8/02* (2009.01)

(52) U.S. Cl.
CPC ................ *H04W 64/00* (2013.01); *H04W 4/02* (2013.01); *H04W 8/02* (2013.01); *H04W 36/0033* (2013.01)
USPC .......................... 455/438; 455/456.5; 455/440

(58) Field of Classification Search
USPC ....................... 455/438, 456.5, 440
See application file for complete search history.

(56) References Cited

U.S. PATENT DOCUMENTS

2005/0075099 A1 *  4/2005  Guyot ........................ 455/414.1
2007/0213060 A1     9/2007  Shaheen
(Continued)

FOREIGN PATENT DOCUMENTS

CN           1633203 A     6/2005
CN         101047992 A    10/2007
(Continued)

OTHER PUBLICATIONS

ISA The State Intellectual Property Office, the P.R. China, International Search Report of PCT/CN2009/000591, Sep. 3, 2009, 6 pages.

*Primary Examiner* — Justin Lee
(74) *Attorney, Agent, or Firm* — Alleman Halle McCoy Russell & Tuttle LLP

(57) ABSTRACT

A method for reporting location information of a user is disclosed, wherein location information of user equipment (UE) is reported during a handover of the UE to another serving cell, and includes: a source evolved Node Base (eNB) initiating a handover procedure; during the handover procedure, the source eNB sending location reporting information to a target eNB, the target eNB acquiring the location information of the UE based on the location reporting information and reporting it to a Mobility Management Entity (MME) corresponding to the target eNB. The source eNB may notify the target eNB based on a handover request of the UE, wherein the target eNB reports the location information after the UE is handed over to another serving cell, so that the target eNB can report the location information of the UE to the MME during the handover procedure of the serving cells.

8 Claims, 5 Drawing Sheets

(56) References Cited

U.S. PATENT DOCUMENTS

2009/0209259 A1* 8/2009 Brusilovsky et al. ......... 455/438
2012/0063419 A1* 3/2012 Zhao et al. ................... 370/331

FOREIGN PATENT DOCUMENTS

CN 101052209 A 10/2007
WO 2008040962 A1 4/2008

* cited by examiner

METHOD, SYSTEM AND DEVICE FOR REPORTING USER LOCATION INFORMATION

CROSS-REFERENCE TO RELATED APPLICATIONS

This application is the U.S. National Phase of International (PCT) Patent Application Serial No. PCT/CN2009/000591, filed May 26, 2009, which claims priority to Chinese Patent Application No. 200810113007.9, filed May 27, 2008, both of which are hereby incorporated by reference in their entirety for all purposes.

FIELD OF THE INVENTION

The invention relates to the domain of mobile communication technology, in particular to a method, a system and a device for reporting location information of user equipment (UE) during the procedure of switching UE.

BACKGROUND OF THE INVENTION

The project of Long Term Evolution (LTE) is an evolution of the Third Generation Wireless Communication (3G), and it improves and enhances the air access technology of 3G, and it takes Orthogonal Frequency Division Multiplexing (OFDM) and Multiple-Input Multiple-Output (MIMO) as the unique standard for the wireless network evolution thereof.

In the LTE system, services based on location information are proposed, such as legal interception, emergency calls. Here, a Mobility Management Entity (MME) needs to know an ID of the serving cell accessed by a UE, or the location information of the UE. When it is required to know the location information of the UE, the MME will send a location information command to the evolved Node B (eNB) to request it to report information of the UE.

Nowadays, the prior art has already proposed a dedicated location reporting procedure, in which the MME requests the eNB to report information about the cell where the UE is located. As seen in FIG. 1, it shows the flow chart of the dedicated location reporting procedure in the prior art during which the MME requests the eNB to report the current location information of the UE, and the following steps are included:

Step S101: The MME sends a location reporting control message to the eNB to query the current location information of the UE. The location reporting control message contains an information element (IE), such as the location information required to be reported and report types. The location information required to be reported comprises the Global Cell Identifier (GCI) of the cell where the UE is located, or geographic location information, etc.; the report types mean that this location reporting control message initiates only one message reporting the GCI of the current cell, or the eNB is required to return a report message as long as the cell of the UE is changed.

Step S102: The eNB returns a location reporting message to the MME; the message carries the location information of the UE, such as the GCI and a geographic location message.

Step S103: The MME sends a cancel location reporting message to the eNB for requiring to terminate the function of location reporting of the UE. It should be indicated that this message is required only when the MME requests a periodic report of location information.

The disadvantage of the prior art is: in the above procedure, although the MME enables the UE to report location information when the UE is handed over to another cell by setting report types, in fact, the target eNB does not receive the location reporting control message from the MME, thereby the target eNB could hardly know whether it is necessary to report location information of the UE, which results in achieving no report of location information after a handover of the UE occurs. Therefore, the flow of reporting the location information in the prior art is still not perfect and has the defect that it is impossible for the target eNB to report location information of the UE after the UE is handed over to another serving cell.

SUMMARY OF THE INVENTION

The present invention aims to solve at least one of the above problems in the prior art and overcome the technical defect that it is impossible to report the location information of the UE after the UE is handed over to another serving cell.

For this purpose, an embodiment of the present invention provides a method for reporting location information of a user, which is used for achieving the report of location information of User Equipment (UE) during the handover procedure, and includes the following steps: a source evolved Node B (eNB) initiates a handover procedure; during the handover procedure, the source eNB sends the location reporting information to a target eNB, the target eNB acquires the location information of the UE based on the location reporting information and reports it to a Mobility Management Entity (MME) corresponding to the target eNB.

An embodiment of the present invention further provides a method for reporting location information of a user, which is used for achieving the report of location information of the UE during the handover procedure of the UE via an X2 interface, and includes the following steps: a source eNB receives the location reporting control message of the MME, wherein the location reporting control message instructs to report the location information of the UE after the UE is handed over to another serving cell; the source eNB initiates the handover procedure; during the handover procedure, the source eNB sends the location reporting information to a target eNB included in a handover request message, the target eNB acquires the location information of the UE based on the location reporting information and reports it to the MME by a path switch request message.

An embodiment of the present invention further provides a method for reporting location information of a user, which is used for achieving the report of location information of a UE during the handover procedure of the UE via an S1 interface or during the handover procedure of the UE from a GPRS EDGE Radio Access Network (GERAN)/UMTS Terrestrial Radio Access Network (UTRAN) to an LTE, and includes the following steps: a source MME sends a location reporting control message to a source eNB, wherein the location reporting control message indicates that the location information of the UE is reported after the UE is handed over to another serving cell; the source MME receives a handover request of the source eNB; and the source MME sends the location reporting information to a target MME by a forward relocation request message based on the location reporting control message sent to the source eNB, the target MME forwards the location reporting information to a target eNB, and the target eNB acquires the location information of the UE based on the location reporting information and reports it to the target MME.

An embodiment of the present invention further provides a method for reporting location information of a user, which includes the following steps: after a UE has been handed over from a source eNB to a target eNB, an MME receives a path switch request message of the target eNB; the MME returns a path switch request ACK message to the target eNB, and the path switch request ACK message carries the location reporting information; and the MME receives the location information of the UE reported by the target eNB via a dedicated location reporting procedure.

An embodiment of the present invention further provides a system for reporting location information of a user, which includes a source eNB, a target eNB, and an MME connected to the source eNB and the target eNB, wherein the source eNB is used for receiving a location reporting control message from the MME and sending the location reporting information to the target eNB via a handover request after the UE has initiated the handover, wherein the location reporting control message indicates that the location information of a UE is reported after the UE is handed over to another serving cell; the target eNB is used for acquiring the location information of the UE based on the location reporting information and reports it to the MME via a path switch request; the MME is used for receiving the location information of the UE reported by the target eNB.

An embodiment of the present invention further provides a source eNB, which includes a control information receiving module, a handover determining module, and a location reporting information sending module, wherein the control information receiving module is used for receiving a location reporting control message sent by an MME, wherein the location reporting control message indicates that the location information of a UE is reported after the UE is handed over to another serving cell; the handover determining module is used for determining whether the UE is handed over to another serving cell or not; the location reporting information sending module is used for sending the location reporting information to the target eNB of the UE based on the location reporting control message, after the handover determining module determines that the UE is handed over to another serving cell, wherein the target eNB acquires the location information of the UE based on the location reporting information and reports it to the MME via a path switch request.

An embodiment of the present invention further provides a system for reporting location information of user, which includes a source eNB, a target eNB, a source MME connected to the source eNB, and a target MME connected to the target eNB, wherein the source eNB is used for receiving a location reporting control message from the source MME, and initiating a handover procedure; the source MME is used for sending the location reporting information to the target MME via forward relocation request information based on the location reporting control message if a UE initiates the handover procedure, wherein the location reporting control message indicates that the location information of the UE is reported after the UE is handed over to another serving cell; the target MME is used for forwarding the location reporting information to the target eNB; the target eNB is used for acquiring the location information of the UE based on the location reporting information and reports it to the target MME.

An embodiment of the present invention further provides a source MME, which comprises a control information sending module, a handover request receiving module and a location reporting information sending module, wherein the control information sending module is used for sending a location reporting control message to a source eNB, wherein the location reporting control message indicates that the location information of a UE is reported after the UE is handed over to another serving cell; the handover request receiving module is used for receiving the handover request of the source eNB; the location reporting information sending module is used for sending the location reporting information to the target MME based on the location reporting control message sent to the source eNB, wherein the target MME forwards the location reporting information to the target eNB, and the target eNB acquires the location information of the UE based on the location reporting information and reports it to the target MME.

An embodiment of the present invention further provides a target MME, which includes a location reporting information receiving module and a forwarding module, wherein the location reporting information receiving module is used for receiving the location reporting information sent by a source MME; the forwarding module is used for forwarding the location reporting information received by the location reporting information receiving module to the target eNB.

An embodiment of the present invention further provides a target eNB, which includes a location reporting information receiving module, a location information acquiring module and a reporting module, wherein the location reporting information receiving module is used for receiving the location reporting information sent by a source eNB or a target MME; the location information acquiring module is used for acquiring the location information of a UE based on the location reporting information received by the location reporting information receiving module; the reporting module is used for reporting the location information of the UE acquired by the location information acquiring module to the MME connected to the target eNB.

In comparison with the prior art, the embodiments of the present invention have at least one of the following advantages: according to the present invention, it is possible for the source eNB to notify the target eNB based on a handover request of the UE that the target eNB should report the location information after the UE is handed over to another serving cell, so that the target eNB can report the location information of the UE to the MME during the handover procedure of the serving cells. The present invention simplifies the signalling flow and is simple to implement. Furthermore, in the present invention, the location reporting IE received by the target eNB is identical to the location reporting IE sent by the source MME to the source eNB, thereby it is ensured that the location information of the UE received by the MME (or the target MME) is the same as what the MME requires to report.

Other aspects and advantages of the present invention will be illustrated in the following description and part of them will become apparent through the following description or be understood through the embodiments of the present invention.

DETAILED DESCRIPTION OF THE PRESENT INVENTION

Hereafter, the embodiments of the present invention will be illustrated in detail, and the examples of the embodiments are shown in figures, wherein identical or similar reference numbers designate an identical or similar element or elements having identical or similar functions throughout. The following embodiments described with reference to the figures are merely exemplary and are only used to illustrate the present invention rather than being construed as limiting the present invention.

The present invention is mainly as follows: when a UE is handed over to a target eNB, a source eNB notifies the target eNB to report the location information of the UE based on location reporting control information received from an MME connected to the source eNB, namely the location reporting information carried by the message sent to the target eNB, so that the target eNB can acquire the location information of the UE based on the location reporting information and report it to an MME connected to the target eNB. In one embodiment of the present invention, the location reporting information is a location reporting IE, which can also be formed by modifying or extending the message format of the message, obviously. Preferably, the location reporting IE adopted when the source eNB notifies the target eNB has the same contents as the location reporting control message, namely they have the identical IE, such as location information required to be reported, or report types. Thereby, the MME and the source eNB send the same IE, so that the location information of the UE reported by the target eNB is just what the MME requires. For example, the source MME notifies the source eNB to report the precise location information of the UE, and after a handover, the target eNB still reports the precise location information of the UE. It shall be explained that the above are just preferable modes of the present invention, and the source eNB can also notify the target eNB in other manners, such as by adding an additional IE or carrying it with an added message.

More specifically, the present invention also provides various embodiments corresponding to different handovers of a UE, such as a handover via an X2 interface, a handover via an S1 interface, or a handover from GPRS EDGE Radio Access Network (GERAN)/UMTS Terrestrial Radio Access Network (UTRAN) to an LTE. Nevertheless, the following embodiments are merely used for better understanding of the present invention, and shall not be construed as limiting the scope of protection of the present invention. For example, not only can the present invention be realized when the handover is performed via an X2 interface, or via an S1 interface, but also the scope of protection of the present invention covers all variations conceivable by a person skilled in the art. Hereafter, it will be described in detail when a UE performs the handover via an X2 interface, or via an S1 interface, respectively.

Figure 2:
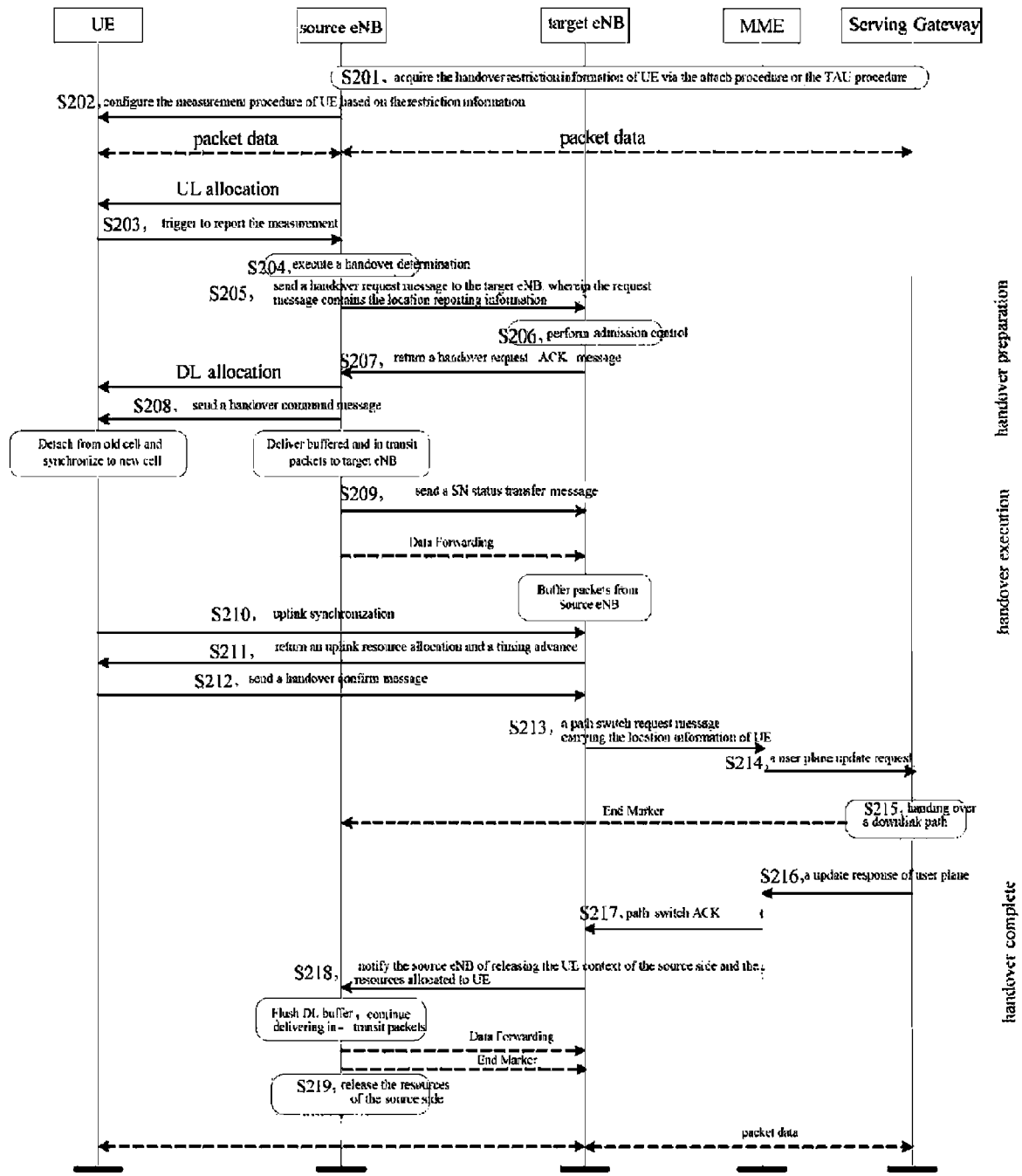
FIG. 2 is a flowchart showing the location information procedure which is piggybacked in a related handover message when an X2-based handover procedure is performed in one embodiment of the present invention.

FIG. 2 is a flowchart showing the location information procedure which is piggybacked in a related handover message when an X2 handover procedure is performed in one embodiment of the present invention. In this embodiment, the UE can be handed over to another serving cell without changing the MME. In this embodiment, the source eNB has already received the location reporting control information sent by the MME, and obtained the indication information of the MME from this location reporting control information. In addition, the MME instructs the eNB to report the location information of the UE when the UE is handed over to another serving cell. The following steps are included:

S201: the source eNB acquires the handover restriction information of a UE in an attach procedure or the procedure of tracking area update (TAU), and stores it in the UE context in the source eNB. The procedure of TAU is: when the UE detects a change to a new tracking area (TA), and the current TA is not in the TA list registered by the UE, the UE initiates the TAU. During this procedure, the MME will allocate a new TA list including the current TA of the UE again, so that the UE can move in the range of the new TA list. S202: the source eNB configures the measurement procedure of the UE based on the area restriction information.

S203: the UE triggers reporting of the measurement.

S204: the source eNB executes a handover determination based on the measurement information reported by the UE and a radio resource management (RRM) algorithm.

S205: the source eNB sends a handover request message to the target eNB, wherein the target eNB is required to reserve resources for the UE in advance, and the UE context information stored in the source eNB is sent to the target eNB. The handover request message includes the location reporting information to notify the target eNB to report the location information of the UE based on the requirement of the location reporting information. In one embodiment of the present invention, the location reporting information is the location reporting IE. Preferably, for the reporting information of the same target eNB and facilitating parsing of the target eNB, the contents of the location reporting IE are the same as that of the IE contained in the location reporting control message sent by the MME to the source eNB, such as the location information required to be reported, and report types. Certainly, the MME may also require the eNB to provide geographic location information of the UE (such as the concrete location information of the UE acquired by triangulation, or the concrete coordinates acquired by a global positioning system module in the UE) according to requirements. In fact, the present invention has no limitation thereto and similar variations should be included in the scope of protection of the present invention. The handover request message includes an X2 signalling connection ID, target cell ID, bearer information of the UE in the source eNB, RRM context, handover area restriction information, history information of the UE and etc.

S206: the target eNB performs admission control according to the bearer information of the UE received from the source eNB, and stores the received information, such as the location reporting IE, in the UE context, and if the location reporting IE indicates that it is required to provide the precise geographic location coordinates of the UE, then the target eNB also needs to acquire the precise geographic location information of the UE, which can be realized, for example, by triangulation, or by requiring the UE to report its GPS data.

S207: the target eNB returns a handover request ACK message after it has reserved resources for the UE in advance, wherein the message includes a handover allowed bearer information, a tunnel end point identifier (TEID) address allocated for data forwarding, and the information to be sent from the source eNB to the UE.

S208: the source eNB sends a handover command message to the UE.

S209: the source eNB sends an SN status transfer message to the target eNB to indicate the receiving status of the uplink data and sending status of the downlink data in the source eNB for the target eNB.

S210: the UE disconnects from the source eNB after the UE has received a handover command, and executes an uplink synchronization with the target eNB.

S211: the target eNB returns an uplink resource allocation and a timing advance to the UE.

S212: the UE sends a handover confirm message to the target eNB after the synchronization with the target cell.

S213 to S217: the target eNB notifies the core network of the handover of the UE, and updates the user plane path. In step S213, the target eNB sends a path switch request message to the MME which carries the location information of the UE, such as the GCI of the UE, or the acquired geographic location parameter information of the UE, and the information about whether the precision requirement is met; if the target eNB cannot provide the location information required by the MME, then the target eNB should also include a cause IE in the path switch request message for indicating a cause. After receiving the path switch message sent by the target eNB, the MME reselects a serving GW for the UE, and notifies the target eNB of establishing bearer with the reselected serving GW.

S218: After the path is updated, the target eNB notifies the source eNB to release the UE context of the source side and the resources allocated to the UE.

S219: the source eNB releases the UE context of the source side and the resources allocated to the UE.

In this embodiment, it is simply realized that the target eNB automatically reports the location information of the UE to the MME based on the notification of the source eNB during the procedure in which the UE is handed over to another serving cell, and the signalling flow is simplified by using a piggyback.

Another embodiment of the present invention based on the procedure of the above embodiment has a different step S205 in which the source eNB does not add location reporting information to the handover request message, so that the source eNB need not report the location information of the UE in the step S213. In this embodiment, the location reporting information is mainly sent to the target eNB by the MME based on the path switch request ACK message in step S213 to step S217. In this step, the location reporting information sent to the target eNB is the same as the location reporting information sent by the MME to the source eNB. The target eNB acquires the location information of the UE based on the location reporting information and reports the location information of the UE according to the step of the dedicated location reporting shown in FIG. 1.

The present invention also provides embodiments in which the target eNB reports the location information of the UE, when a handover of the UE is performed via an S1 interface, or a handover of the UE is performed from a GERAN/UTRAN to an LTE. The following embodiments are merely preferable modes of the present invention, and the scope of protection of the present invention should include all variations conceivable by a person skilled in the art based on the concept of the present invention.

Embodiment 1

Figure 3:
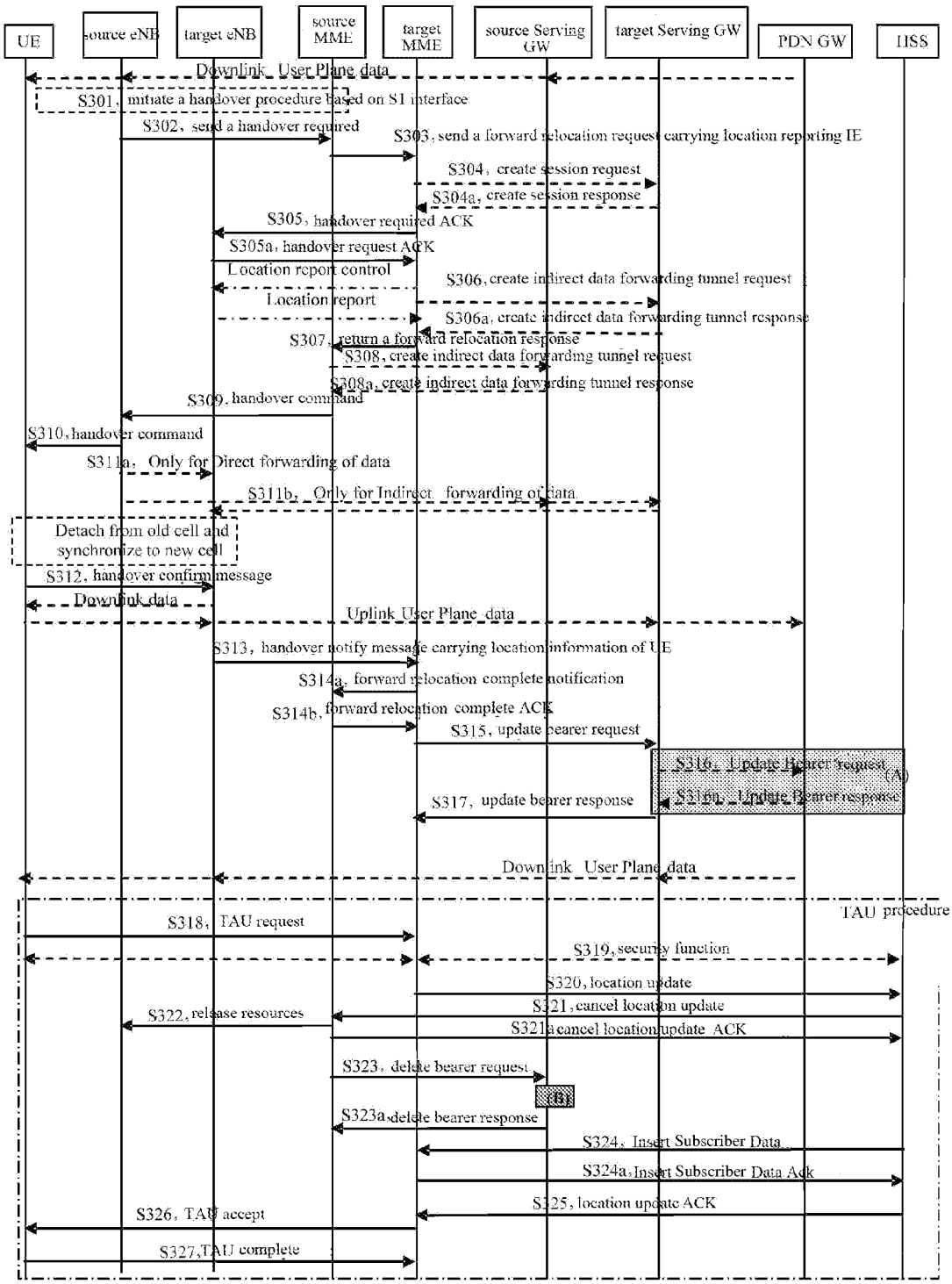
FIG. 3 is a flowchart showing the location information procedure which is piggybacked in a related handover message when an S1-based handover procedure is performed in one embodiment of the present invention.

FIG. 3 is a flowchart showing the location information procedure, which is piggybacked in a related handover message when an S1-based handover procedure is performed in one embodiment of the present invention. In this embodiment, a handover of a serving GW also occurs during the handover procedure of the UE. According to this embodiment, the source MME notifies the target MME, and then the target MME notifies the target eNB to report the location information of UE. Similarly, it is preferable in this embodiment that the location reporting IE sent by the target MME to the target eNB is the same as the location reporting IE sent by the source MME to the source eNB. The following steps are included:

S301 to S303: the source eNB decides to initiate a handover procedure, and after determining this handover can not be implemented via X2 interface, the source eNB sends a handover required to the source MME so as to initiate a handover procedure via an S1 interface. The source MME selects a target MME, and sends the MME UE Context containing PDN-GW and S-GW related bearer information to the target MME, and sends the location reporting information to the target MME. After receiving the location reporting information, the target MME will notify the target eNB to report the location information of the UE based on the location reporting information. In one embodiment of the present invention, the location reporting information is a location reporting IE.

In another embodiment of the present invention, the forward relocation request message sent by the source MME to the target MME contains the location reporting IE in step S303. Preferably, the location reporting IE has the same contents as the location reporting IE contained in the location reporting control message sent by the source MME to the source eNB, such as location information required to be reported, or report types. It certainly may further include a precision of the UE geographic location coordinates, a response time, a report priority and the reported client server types.

S304: in this step, during an S-GW handover, the target MME reselects a target S-GW, and establishes a user plane for all bearer transferred to the target MME. Meanwhile, the target MME stores the location reporting IE received from the source MME in the UE context.

S305: the target MME requires the target eNB to establish the UE context which includes bearer information to be established, and sends the stored location reporting IE carried by the handover request message to the target eNB.

S306: when indirect forwarding is used, the target MME establishes a forward parameter configuration at the target S-GW.

S307: this step is a response to the forward relocation request in step S303; when indirect forwarding is used, the address information of the forward tunnel is transferred in this step.

S308: this step is applied for indirect forwarding, and the TEID of the target serving GW for forwarding is transferred to the source serving GW.

S309: in addition to notifying the source eNB that the handover is ready and notifying the UE of performing the handover, a data forwarding tunnel address parameter is also carried to accomplish the establishment of the forwarding tunnel.

S310: the source eNB notifies the UE that it can change the connection network.

S311a to S311b: they indicate the forwarding data path of direct forwarding and indirect forwarding, respectively.

S312: when the UE has entered the target access system, and has been allocated with a unique identifier by the access network, a handover confirm message is sent to notify the target eNB.

S313: the target eNB notifies the target MME by a handover notify message which also carries the location information of the UE reported by the target eNB, such as the CGI, the geographic location parameters of the UE and information about whether the precision is met or not. Evidently, if the target eNB cannot provide the required location information, the handover notify message should also contain a cause IE for indicating a reason.

S314: the target MME notifies the source MME that the UE has been successfully connected to the target system. At this time, a timer in the source MME is activated to monitor when the resource in the source system is released.

S315 to S317: the target MME sends the tunnel address information allocated to the bearer by the target eNB to the S-GW, and establishes a downlink transmission channel between the UE and the PDN-GW. If the S-GW is relocated, then step S316 is used to update the bearer between the S-GW and the PDN-GW.

At any time after step S312, the UE may initiate the TAU procedure performed at the beginning of step S318. In this procedure, the UE sends a TAU request to the target MME, and the target MME reallocates a new TA list which contains the current TA for the UE, and updates the location information of this UE in the home subscriber server (HHS), wherein the TAU procedure is as prescribed in the 3GPP protocol, and thereby it is omitted here.

Figure 1:
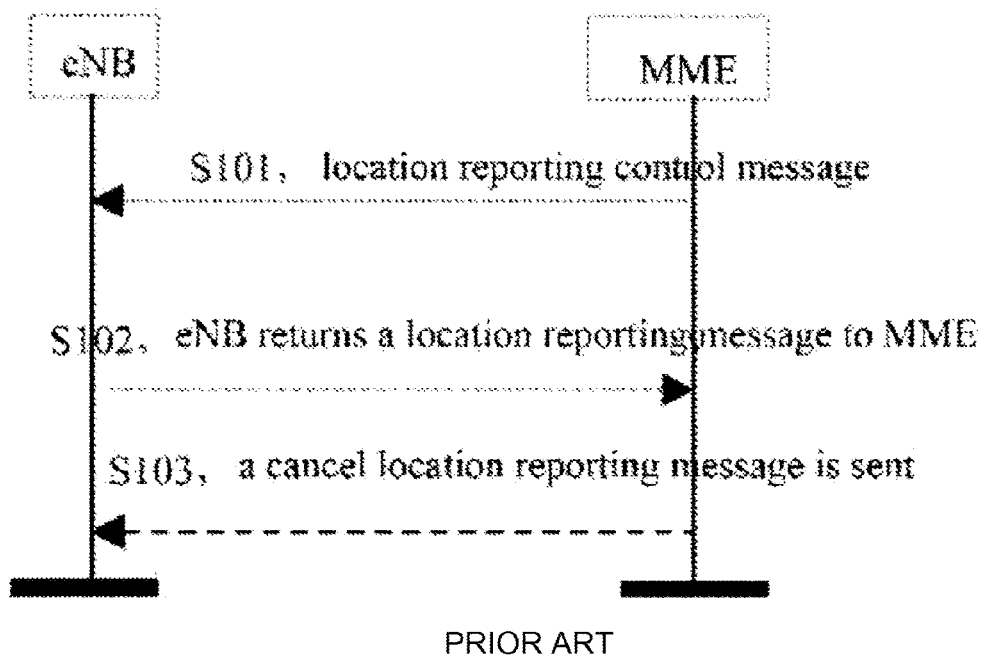
FIG. 1 is a flowchart showing an MME requesting an eNB to report the current location information of a UE according to the prior art.

Embodiment 2 this embodiment is applied to the same situation as the above embodiment 1, and the difference merely lies in: according to this embodiment, after the source MME sends the location reporting information (preferably a location reporting IE) carried by a forward relocation request message to the target MME, the target MME newly initiates the location reporting procedure shown in FIG. 1 rather than sending this location reporting IE to the target eNB via a handover request message. For better understanding of the present invention, the procedure of the present embodiment will be briefly illustrated in conjunction with FIG. 3. When the MME relocation procedure occurs, a normal handover procedure is implemented. After the source MME transfers the location reporting information (e.g., a location reporting IE) to the target MME in the forwarding relocation procedure of step S303, the target MME does not carry the location reporting information during the procedure of sending the handover request (step S305) message to the target eNB. Until the resource allocation procedure at the target side is finished, the target MME initiates a dedicated location report procedure to require the target eNB to report the location information of the UE.

In the above embodiment 1 and embodiment 2, the serving GW also changes while the MME changes. For the situation that the serving GW does not change, however, the method described in those two embodiments is also applicable, because the procedure is identical at the RAN side, and the difference merely lies in the procedure about the user plane. Therefore, the specific procedure is not described here anymore.

In the above embodiments 1 and 2, the handover of the UE is performed via the S1 interface, which is also applicable for the situation that the handover of the UE from the GERAN/UTRAN to the LTE. That is, it is also possible to carry the location reporting information (e.g., a location reporting IE) in the forward relocation request message in a piggyback manner, and carry the location reporting information in the handover request message sent from the target MME to the target eNB to require the target eNB to report the location information of the UE. Or, after the location reporting information (e.g., a location reporting IE) carried in the forward relocation request message has been transferred to the target MME, a normal handover procedure is executed. After the handover has been finished, a new target MME initiates a dedicated location report procedure to require the target eNB to report the location information of the UE, such as the GCI of the cell or the geographic location information of the UE.

The present invention also discloses a plurality of systems for reporting the location information of the UE by the target eNB to the MME during the procedure that the UE is handed over to another serving cell. For better understanding of the systems according to the present invention, hereafter the illustration will be made respectively depending upon different ways of handover of the UE (e.g., a handover via an X2 or an S1 interface, or a handover from a GERAN/UTRAN to an LTE).

Figure 4:
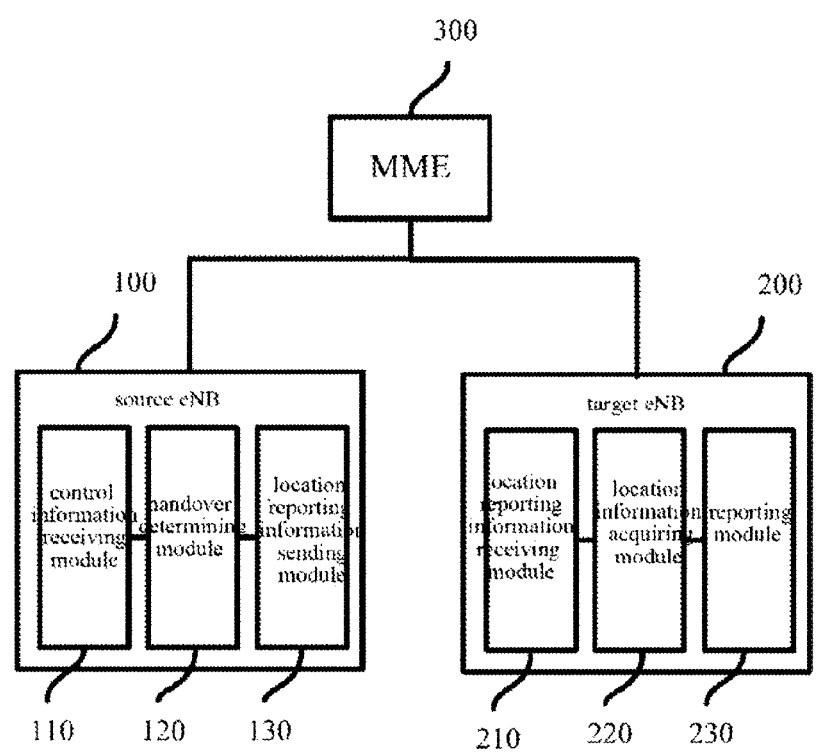
FIG. 4 is a structural view of a system showing a handover of a UE performed via an X2 interface in one embodiment of the present invention.

FIG. 4 is a structural view of a system showing a handover of the UE performed via an X2 interface in one embodiment of the present invention, and according to this embodiment, the UE is handed over to another serving cell via an X2 without the MME. The system includes a source eNB 100, a target eNB 200, and an MME 300 connected to the source eNB 100 and the target eNB 200, wherein the source eNB 100 is used for receiving a location reporting control message from the MME 300 and sending the location reporting information to the target eNB 200 via a handover request after the UE has initiated the handover, wherein the location reporting control message indicates the location information of the UE is reported after the UE is handed over to another serving cell; the target eNB 200 is used for acquiring the location information of the UE based on the location reporting information and reports it to the MME 300 via a path switch request; and the MME 300 is used for receiving the location information of the UE reported by the target eNB 200. It shall be explained that it is a preferable embodiment of the present invention in which the location reporting information is sent to the target eNB 200 via a handover request and the target eNB 200 reports to the MME 300 via a path switch request. A person skilled in the art could make variations based on the spirit of the present invention, and thereby any reasonable variations and any changes having the predictable effects should be covered by the scope of protection of the present invention.

In the above system, the source eNB 100 comprises a control information receiving module 110, a handover determining module 120, and a location reporting information sending module 130, wherein the control information receiving module 110 is used for receiving a location reporting control message sent by the MME 300, wherein the location reporting control message indicates the location information of the UE is reported after the UE is handed over to another serving cell; the handover determining module 120 is used for determining whether the UE is handed over to another serving cell or not; and the location reporting information sending module 130 is used for sending the location reporting information to the target eNB 200 of the UE based on the location reporting control message, after the handover determining module 120 determines that the UE is handed over to another serving cell.

In the above system, the target eNB 200 comprises a location reporting information receiving module 210, a location information acquiring module 220 and a reporting module 230, wherein the location reporting information receiving module 210 is used for receiving the location reporting information sent by the source eNB 100; the location information acquiring module 220 is used for acquiring the location information of the UE based on the location reporting information received by the location reporting information receiving module 210; and the reporting module 230 is used for reporting the location information of the UE acquired by the location information acquiring module 220 to the MME 300 connected to the target eNB 200.

Figure 5:
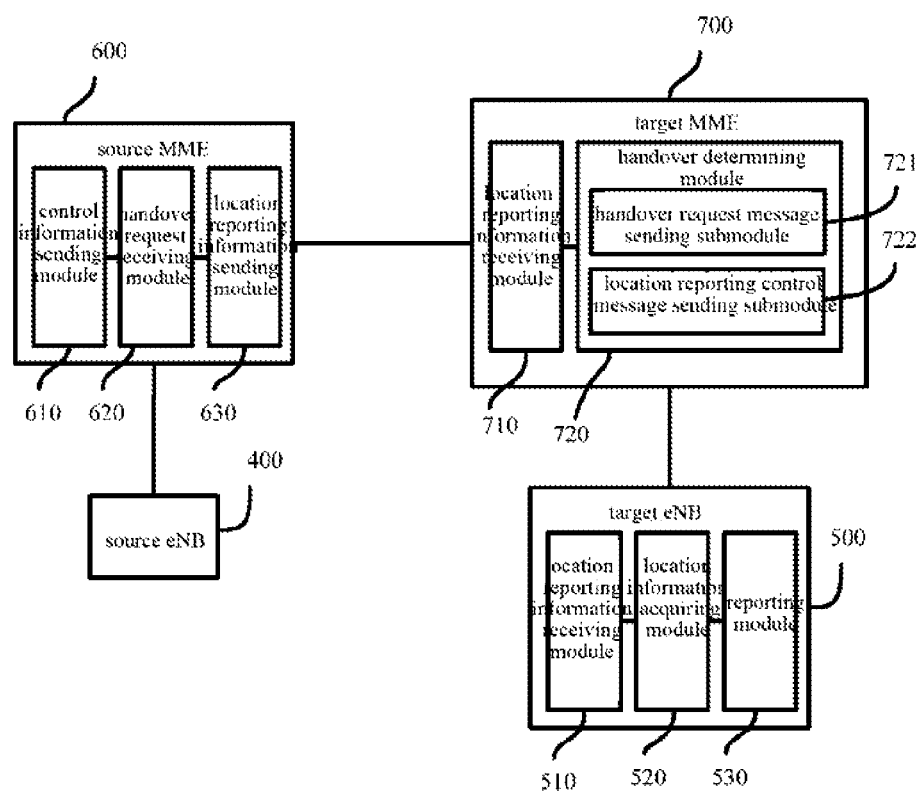
FIG. 5 is a structural view of a system showing a handover of a UE performed via an S1 interface in one embodiment of the present invention.

The present invention further provides a system for the handover of the UE via an S1 interface. FIG. 5 is a structural view of a system showing a handover of the UE performed via an S1 interface in one embodiment of the present invention. The system for reporting location information of a user includes a source eNB 400, a target eNB 500, a source MME 600 connected to the source eNB 400, and a target MME 700 connected to the target eNB 500. The source eNB 400 is used for receiving a location reporting control message from the source MME 600 and initiating a handover procedure; the source MME 600 is used for reporting the location information of the UE after the location reporting control message indicates that the UE is handed over to another serving cell, and sending the location reporting information to the target MME 500 via a forward relocation request message based on the location reporting control message; the target MME 700 is used for forwarding the location reporting information to the target eNB 500; the target eNB 500 is used for acquiring the location information of the UE based on the location reporting information and reports it to the target MME 700.

In the above system, the source MME 600 comprises a control information sending module 610, a handover request receiving module 620 and a location reporting information sending module 630, wherein the control information sending module 610 is used for sending a location reporting control message to the source eNB 400, wherein the location reporting control message indicates the location information of the UE is reported after the UE is handed over to another serving cell; the handover request receiving module 620 is used for receiving the handover request of the source eNB 400; and the location reporting information sending module 630 is used for sending the location reporting information to the target MME 700 based on the location reporting control message sent to the source eNB 400.

In the above system, the target MME 700 comprises a location reporting information receiving module 710 and a forwarding module 720, wherein the location reporting information receiving module 710 is used for receiving the location reporting information sent by the source MME 600; the forwarding module 720 is used for forwarding the location reporting information received by the location reporting information receiving module 710 to the target eNB 500.

The present invention also provides a plurality of manners for how the target MME 700 notifies the target eNB 500. Here, only two preferable manners are described in the present invention. In one manner, after receiving the location reporting information from the source MME 600, the target MME 700 sends it to the target eNB 500 via the handover request message. Thus, in this manner, the forwarding module 720 comprises a handover request message sending sub-module 721, which is used for sending the location reporting information to the target eNB 500 via the handover request message. In the other manner, after receiving the location reporting information from the source MME 600, the target MME 700 newly initiates a dedicated location reporting procedure to send the location reporting information to the target eNB 500. Thus, in this manner, the forwarding module 720 comprises a location reporting control message sending sub-module 722, which is used for initiating the dedicated location report procedure based on the location reporting information, and requiring the target eNB 500 to report the location information of the UE.

In the above system, the target eNB 500 comprises a location reporting information receiving module 510, a location information acquiring module 520 and a reporting module 530, wherein the location reporting information receiving module 510 is used for receiving the location reporting information sent by the target eNB 700; the location information acquiring module 520 is used for acquiring the location information of the UE based on the location reporting information received by the location reporting information receiving module 510; and the reporting module 530 is used for reporting the location information of the UE acquired by the location information acquiring module 520 to the MME connected to the target eNB 500. In this embodiment, the MME connected to the target eNB 500 is the target MME 700.

The handover of the UE from a GERAN/UTRAN to an LTE is similar to the handover of the UE via the S1 interface, and therefore it is not described in detail any more.

According to the present invention, it is possible that the source eNB notifies the target eNB to report the location information based on a handover request of the UE after the UE is handed over to another serving cell, so that the target eNB can automatically report the location information of the UE to the MME during the handover procedure of the serving cells. The present invention simplifies the signalling flow and is implemented simply. Furthermore, in the present invention, the location reporting IE received by the target eNB is identical to the location reporting IE sent by the source MME to the source eNB, thereby it is ensured that the location information of the UE received by the MME (or the target MME) is as required to report by the MME.

Although the embodiments of the present invention have been shown and described in the above, a person skilled in the art could subject these embodiments to various variations, modifications, substitutions and transformations without departing from the principle and spirit of the present invention, and the scope of protection of the present invention is defined by the appended claims and equivalents thereof.

The invention claimed is:

1. A method for reporting location information of a user, which is used for achieving reporting of location information of user equipment (UE) during handover of the UE to another serving cell, the method comprising:

a source evolved Node B (eNB) independently initiating a handover procedure without a handover procedure request sent from a source Mobility Management Entity (MME), the source MME distinct from a serving gateway (GW) and the handover procedure request including any communication initiating a handover procedure; and during the handover procedure, the source eNB sending location reporting information to a target eNB, the target eNB acquiring location information of the UE based on the location reporting information and reporting the location information of the UE to a target MME corresponding to the target eNB in response to the target eNB acquiring the location information of the UE, the location reporting information including a Global Cell Identifier (GCI), wherein the source eNB sending the location reporting information to the target eNB includes:

the source MME corresponding to the source eNB selecting the target MME corresponding to the target eNB, after receiving a handover request from the source eNB;

the source MME sending the location reporting information to the target MME via a forward relocation request message; and the target MME forwarding the location reporting information to the target eNB, the target MME forwarding the location reporting information to the target eNB includes:

the target MME sending the location reporting information to the target eNB via a handover request message, where the target eNB acquiring the location information of the UE based on the location reporting information and reporting it to the target MME corresponding to the target eNB includes:

the target eNB acquiring the location reporting information from the handover request message; and the target eNB sending the location information of the UE to the target MME.

2. The method of claim 1, wherein before the source eNB initiates the handover procedure, the method further includes:

the source eNB receiving a location reporting control message of a MME connected to the source eNB, the location reporting control message indicating that the location information of the UE is reported after the UE is handed over to another serving cell.

3. The method of claim 2, wherein the location reporting information includes a location reporting information element (IE).

4. The method of claim 3, wherein the location reporting IE includes the same content as the location reporting control message received by the source eNB from an MME connected to the source eNB.

5. The method of claim 1, wherein the source eNB sending the location reporting information to the target eNB includes:

the source eNB sending the location reporting information to the target eNB via the handover request message.

6. The method of claim 5, wherein the target eNB acquiring the location information of the UE based on the location reporting information and reporting the location information of the UE to the target MME corresponding to the target eNB includes:

the target eNB acquiring the location reporting information from the handover request message; and the target eNB sending the location information of the UE to the target MME.

7. The method of claim 1, wherein the source eNB sending the location reporting information to the target eNB includes:

the source MME corresponding to the source eNB selecting the target MME corresponding to the target eNB, after receiving the handover request from the source eNB;

the source MME sending the location reporting information to the target MME via a forward relocation request message; and the target MME forwarding the location reporting information to the target eNB.

8. The method of claim 7, wherein the target MME forwarding the location reporting information to the target eNB includes:

the target MME sending the location reporting information to the target eNB via the handover request message.

\* \* \* \* \*